Aug. 22, 1967     L. L. LUSSIER     3,336,693
ANGLER'S JIG BOX
Filed July 30, 1965
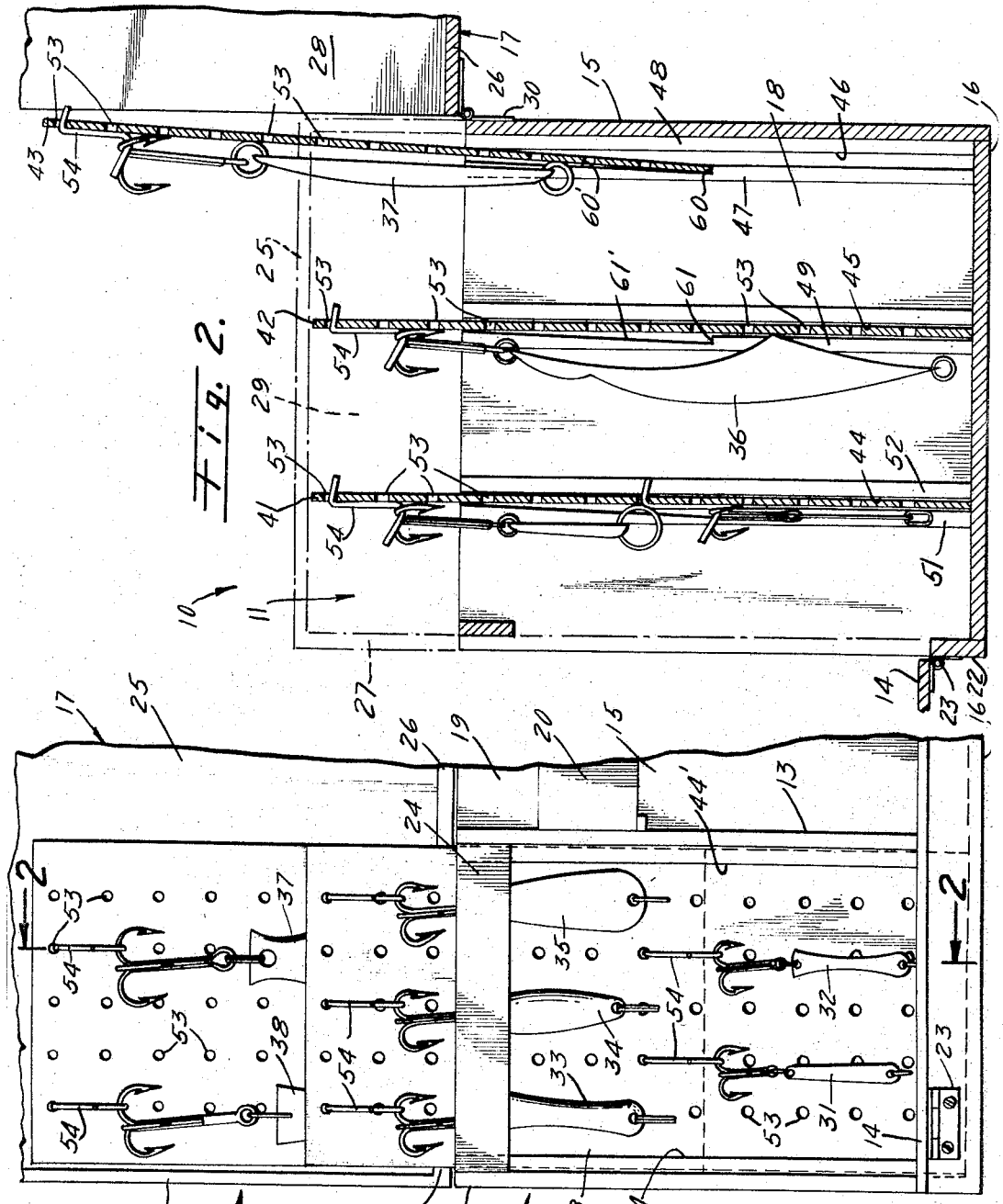
Leonard L. Lussier
INVENTOR.
BY Beehler & Arant
Attorneys United States Patent Office 3,336,693
Patented Aug. 22, 1967

3,336,693
ANGLER'S JIG BOX
Leonard L. Lussier, 11509 Brimley St.,
Norwalk, Calif. 90650
Filed July 30, 1965, Ser. No. 476,047
1 Claim. (Cl. 43—54.5)

ABSTRACT OF THE DISCLOSURE

A tackle box in which fishing jigs and lures are independently suspended on a plurality of vertical slidably mounted carrier panels within the tackle box, said box having side walls provided with tracks receiving the panels and said tracks being provided with an upwardly facing shoulder whereby a panel may be raised and held in an elevated exposed position.

The invention relates to tackle boxes for fishermen and in particular a tackle box specially equipped so as to accommodate fishing jigs.

Tackle boxes in general for fishermen are customarily compartmentalized containers which vary in size depending upon the needs of the fisherman and his versatility. Most fishermen who fish for sport make use of a tackle box to contain all of the fisherman's needs irrespective of where he might elect to do a particular day's fishing. Some fishermen change about from bait fishing to fishing with lures or jigs in the course of a day's activity. Different kinds of fishing ventures regularly require different kinds of equipment, as for example, bottom fishing demands special sinkers, leaders, hooks, and on some occasions lures. Ocean fishing requires different equipment than that used in fresh water lakes and streams.

Some fishermen specialize in the handling of fishing lures and jigs, although this is a type of sport fishing limited to artificial lures and jigs, even in this respect there are many different kinds of lures to accommodate different circumstances. Lures for trolling on the surface are different from lures for trolling deep beneath the surface. Some lures which are suitable for trolling are not suitable for casting and vice-versa. Therefore, even though the sport fisherman may elect to use only artificial lures, his tackle box must be such as to accommodate a considerable variety of lures for even a day's fishing activity.

Common practice in the past has been to store such jigs and lures in compartmentalized drawers. On other occasions special trays have been provided in tackle boxes to fit different lures and to spread them out when needed to make selection of one or another as easy as possible.

Because fishing jigs and lures are always equipped with an assortment of hooks they are quite likely to become entangled with each other whether or not leaders are removed when put in the tackle box. They are always likely to snag when removed and when snagging occurs they often catch the fingers. There is little more disconcerting in the excitement of taking advantage of a school of fish than to reach into a tackle box and find a nest of hooks when selecting a particular lure. Moreover, when lures and jigs are not carefully stored they become scratched and chipped, hook points get bent and dulled and selection becomes difficult.

It is therefore among the objects of the invention to provide a new and improved tackle box especially equipped for the storage of fishing jigs and lures.

Another object of the invention is to provide a new and improved tackle box wherein artificial jigs and lures are stored in such a manner that they can be readily displayed for selection during a fishing venture without need for removing display portions of the box from the box itself.

Still another object of the invention is to provide a new and improved angler's jig box wherein jigs are segregated, suspended separately for ease of selection, stored in a convenient fashion, and where the jig box is easy to maintain the jigs in a satisfactory arrangement and which is of such construction that all of the jigs can be quickly and easily removed to permit cleaning of the jig box and which then can be immediately replaced in the customary orderly arrangement.

Also included among the objects of the invention is to provide a new and improved angler's jig box of such construction that display panels are provided for carrying the jigs in a manner such that they can be made available for visual inspection and which at the same time is sufficiently versatile so that the jigs can be rearranged in virtually almost any desired order so as to most satisfactorily fit the needs of the sport fishing angler for virtually any fishing activity.

With these and other objects in view, the invention consists in the construction, arrangement, and combination of the various parts of the device, whereby the objects contemplated are attained as hereinafter set forth, pointed out in the appended claim and illustrated in the accompanying drawings.

In the drawings:

FIGURE 1 is a fragmentary front elevational view of a tackle box showing that portion of the box which is especially arranged for the storing and display of artificial lures.

FIGURE 2 is a vertical sectional view taken on the line 2—2 of FIGURE 1.

In an embodiment of the invention chosen for the purpose of illustration there is shown a tackle box indicated generally by the reference character 10, one end of which, forming the subject matter of the invention, is equipped as an angler's jig box or jig storage compartment 11. The jig box includes an outside wall 12, an inside wall 13, a front wall 14, a rear wall 15, a bottom wall 16, and a lid 17. The walls, specifically identified herein, surround a chamber indicated by the reference character 18. Incidentally only and as a matter of convenience, the tackle box may be provided with a conventional storage compartment 19 equipped for example with a tray 20 and a storage space 21 for conventional fishing gear.

Extending across the lower front of the tackle box is a strip 22, fastened as shown to the bottom 16 and to which the front wall 14 is secured by hinges such as the hinge 23. Fashioned in this manner the front wall 14 can be lowered to expose the contents of the tackle box as a whole. A second strip 24 near the upper end of the front of the box may be provided for strengthening purposes, the upper strip 24 being fastened at the left end to the outside wall 12 and at the right end to the inside wall 13 by appropriate fastening means not shown.

The lid 17 includes a cover 25 from which there depends a skirt including a rear skirt portion 26, a front skirt portion 27, and a side skirt portion 28. By providing the skirt portions as shown and described, the lid defines an upper chamber 29 located immediately above the chamber 18 previously referred to. Hinges like the hinge 30 serve to hingedly secure the lid 17 at the rear skirt portion 26 thereof to the rear wall 15, as shown to good advantage in FIGURE 2.

The chamber 18 is especially equipped for the storing and display of an assortment of artificial lures and jigs some of which are indicated by the reference characters 31, 32, 33, 34, 35, 36, 37, and 38.

To properly mount the jigs, there are provided three carrier panels 41, 42, and 43 in the chosen embodiment of the invention. For mounting the carrier panel 41 which stands as the forwardmost of the three panels, there is provided a pair of tracks 44, 44'. A second intermediate pair of tracks is exemplified by the track 45, and a third pair of tracks toward the rear is exemplified by the track 46. The pairs of tracks are all substantially the same. For example, the track 46 is constructed of two vertical strips 47 and 48 spaced one from another and providing between them the track 46. Similarly, the track 45 is formed by vertical strips 49 and 50 and the track 44 by the vertical strips 51 and 52. The vertical strips and accordingly the respective track extend for the full height of the outside wall 12 in one instance and the inside wall 13 in the other. The pair of tracks 44, 44' is spaced inwardly from the front wall 14, the pair of tracks exemplified by the track 45 spaced inwardly from the tracks 44, 44' and forwardly of the track 46, whereas the track 46 is located immediately adjacent the rear wall 15.

The carrier panel 41 is of such size and construction that it slides up and down in the pair of tracks 44, 44'. It will be noted that the height of the carrier panel 41 is considerably higher than the height of the outside wall 12 so that the carrier panel extends appreciably above the top of the outside wall and occupies most of the vertical distance between the top and bottom of the upper chamber 29 within the lid 17. For convenience the carrier panel is provided with a series of perforations 53 some of which are provided with brackets 54, the brackets being in the form of hooks which can be shifted from one perforation to another as occasion may demand. Various types of brackets may be employed successively mounted in one fashion or another upon the carrier panel 41, either stationarily or interchangeably as suggested in the embodiment shown in FIGURES 1 and 2. The carrier panel 42 and also the carrier panel 43 is similarly equipped. The jigs are conveniently suspended by fishing hooks on the jigs on the sundry brackets 54 as clearly shown in FIGURES 1 and 2.

Although the front wall 14 can be pivoted downwardly about its hinges 23 to expose the front face of the carrier panel 41 thereby providing access to the jigs 31 through 35 inclusive, carrier panels 42 and 43 are normally concealed. Means, however, are provided to hold one or both of the carrier panels 42 and 43 in elevated position like the position of the carrier panel 43 in FIGURES 1 and 2. This is accomplished in the chosen embodiment by providing a pair of shoulders like the shoulder 60 at a location somewhat above midway between top and bottom of the track 46, the shoulder 60 being a recess in the vertical strip 47. The strip 47 may be recessed throughout a substantial portion 60' of its upper end so that when the carrier panel 43 is lifted to the position shown in FIGURES 1 and 2, the bottom of the carrier panel can be shifted forwardly so as to rest upon the shoulder 60 and thereby hold a substantial part of the upper portion of the carrier panel 43 in full view when the lid 17 is opened as shown. In this elevated position the carrier panel 43 is tilted slightly toward the rear and easily stays in the exposed position so that the angler may readily select lures like the lures 37 and 38 which have been hung on the carrier panel 43, and where they can be easily lifted and removed when needed or replaced when the need no longer continues.

The pair of tracks exemplified by the track 45 is also provided with a shoulder 61 on each side formed by the provision of a similar recess 61', thereby to make it possible to hold the carrier panel 42 in elevated position when desired. If need be, the pair of tracks 44, 44' can be similarly equipped. It will be understood that the shoulders 60 or the shoulders 61, as the case may be, are provided in both tracks of the pair so that opposite ends of the respective carrier panels are both supported. Although simple cut-out recesses providing shoulders like the shoulders 60 and 61 are shown and described, other appropriate means may be provided for engagement with the carrier panels at the side edges or elsewhere, thereby to hold one or another or all of the carrier panels in the elevated or lifted position while the jigs are being displayed for prospective use. When the carrier panels are to be returned, they are dislodged from the shoulders 60 or 61, as the case may be, or from some other retention means as may be provided and the carrier panels thereafter dropped or pushed to lowermost position like the position of carrier panels 41 and 42 so that the lid 17 can be closed.

It will be appreciated further that the jigs are always hung in proper position whether the carrier panels on which they hang are elevated for use or whether they are lowered into the jig storage compartment for storage and transportation. Ample room is provided between front and rear faces of the panels to accommodate jigs of various thicknesses and the length of the jig is limited only by the height of the jig storage compartment. By having the lid 17 constructed as shown with the skirt portions defining the upper chamber 29, any one of the carrier panels can be easily grasped by hand and lifted upwardly when desired without inconvenience. With the construction shown and described only those jigs which chance to be needed can be displayed for easy selection so that the user will not become entangled with jigs not needed at the moment. Should a change be desired, jigs not needed can be lowered into storage position within the jig storage compartment and other jigs elevated for ease in selection and removal. Carrier panels can be easily shifted in position so that the foremost panel can be slid into position in the rear tracks and vice-versa, as occasion may require, inasmuch as all the panels can be made interchangeable within the respective tracks. Although the panels are illustrated as having brackets 54 on one side only, it will be understood that in larger boxes brackets like the brackets 54 may be provided on rear faces of the carrier panels, it being necessary for ease and use only to lift the respective carrier panel from its pair of tracks and reverse its front face for back face, thereby to display those jigs normally attached on the rear face when that particular selection of jigs is desired.

From the foregoing description it will be appreciated that a great many different sizes and varieties of jigs can be easily stored in a compact space, but that all of them are immediately ready for selection and use merely by lifting the appropriate carrier panel to a readily accessible position as shown and described.

While the invention has herein been shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices.

Having described the invention, what is claimed as new in support of Letters Patent is:

An angler's fishing jig container comprising side walls, front and rear walls and a bottom wall forming a chamber within said container and a lid for said chamber having a hinged connection to the rear wall, a hinged connection between the bottom of the front wall and the container adjacent the bottom wall whereby said front wall may be swung open to expose the interior of the chamber, a plurality of pairs of tracks, said pairs of tracks being spaced from each other and the front and rear walls of the container, each pair of tracks comprising laterally spaced inwardly facing channels provided on inside faces of the respective side walls, and a carrier panel slidably mounted in each pair of tracks, each said carrier panel being longer than the height of the side walls so that upper exposed ends of the carrier panels extend above the side walls, said lid having skirts at the side edges overlying said upper exposed ends of the carrier panels, a plurality of adjustable jig suspending hangers on each carrier panel, and an upwardly facing shoulder provided on one side of each pair of tracks intermediate upper and lower ends thereof adapted to be engaged by the bottom of the respective carrier panel in raised position whereby to hold the respective carrier panel in raised position with more of said last carrier panel exposed than carrier panels which are not in raised position.

References Cited
UNITED STATES PATENTS

| | | | |
|---|---|---|---|
| 2,573,431 | 10/1951 | Gibson | 43—54.5 |
| 2,711,050 | 6/1955 | McIntyre | 43—57.5 |
| 2,866,295 | 12/1958 | Shanks | 43—57.5 |
| 3,122,855 | 3/1964 | Collier | 43—57.5 |

SAMUEL KOREN, *Primary Examiner.*

HUGH R. CHAMBLEE, *Examiner.*